US 6,705,476 B2

(12) United States Patent
Linder et al.

(10) Patent No.: US 6,705,476 B2
(45) Date of Patent: Mar. 16, 2004

(54) SHIPPING RACK WITH TORSIONALLY LOADED SHELF

(75) Inventors: Gary M. Linder, Troy, MI (US); Gene Hooper, White Lake, MI (US)

(73) Assignee: Central Metal Products, Inc., Warren, MI (US)

( * ) Notice: Subject to any disclaimer, the term of this patent is extended or adjusted under 35 U.S.C. 154(b) by 0 days.

(21) Appl. No.: 10/225,898

(22) Filed: Aug. 22, 2002

(65) Prior Publication Data

US 2003/0038101 A1 Feb. 27, 2003

Related U.S. Application Data

(60) Provisional application No. 60/314,121, filed on Aug. 22, 2001.

(51) Int. Cl.[7] .................................................. A47F 5/00
(52) U.S. Cl. ........................................ 211/150; 211/170
(58) Field of Search ................................. 211/150, 149, 211/170; 410/32, 42, 47; 108/136

(56) References Cited

U.S. PATENT DOCUMENTS

| 3,143,087 | A | * | 8/1964 | Rodder | 108/116 |
| 3,527,360 | A | * | 9/1970 | Hager | 211/150 |
| 3,762,572 | A | * | 10/1973 | Hager | 211/24 |
| 4,200,195 | A | * | 4/1980 | Hager | 211/24 |
| 4,744,474 | A | * | 5/1988 | Tallving | 211/133.1 |
| 5,324,105 | A | * | 6/1994 | Christensen | 312/319.4 |

* cited by examiner

Primary Examiner—Robert W. Gibson, Jr.
(74) Attorney, Agent, or Firm—Rader, Fishman & Grauer PLLC

(57) ABSTRACT

A shipping/storage rack comprising an upward biasing arrangement has been achieved. The upward biasing arrangement includes a spring actuated device that biases upward movement of a pivotable shelf.

27 Claims, 8 Drawing Sheets

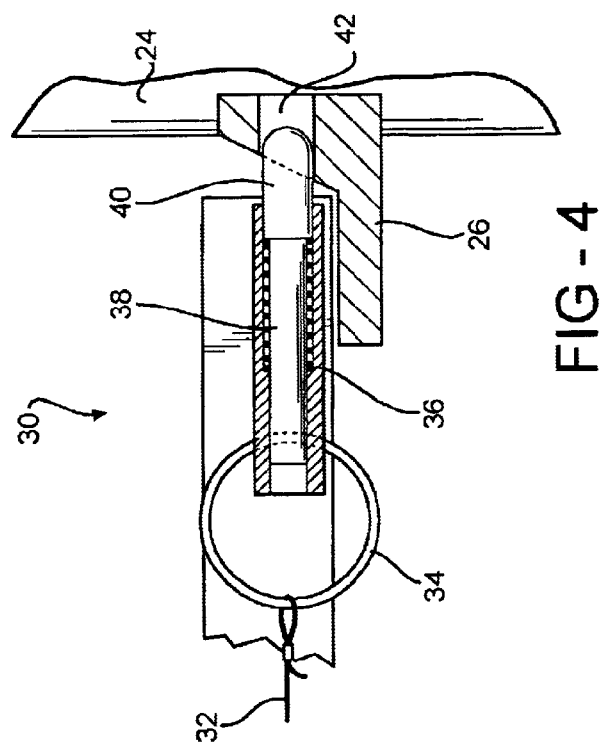
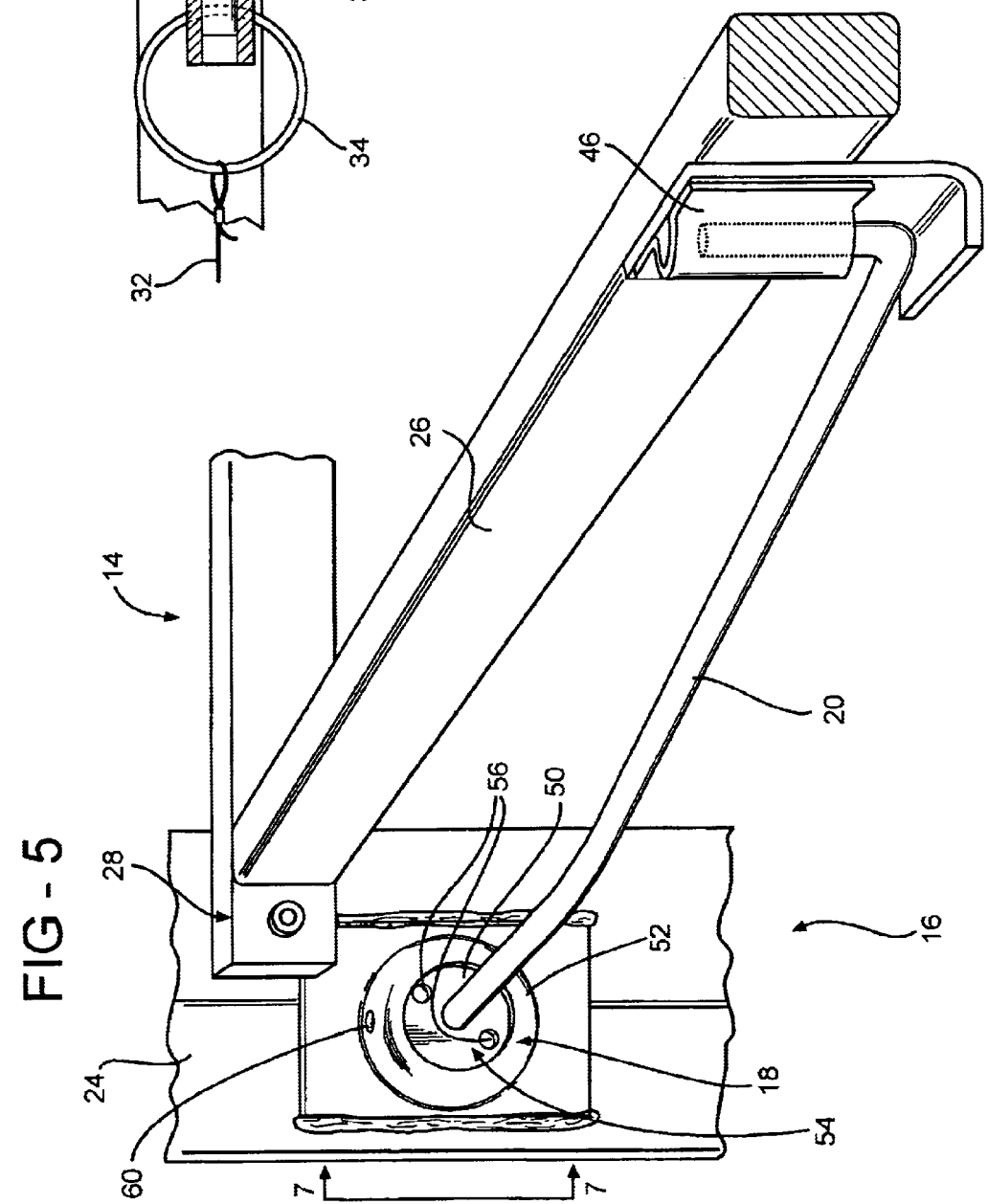

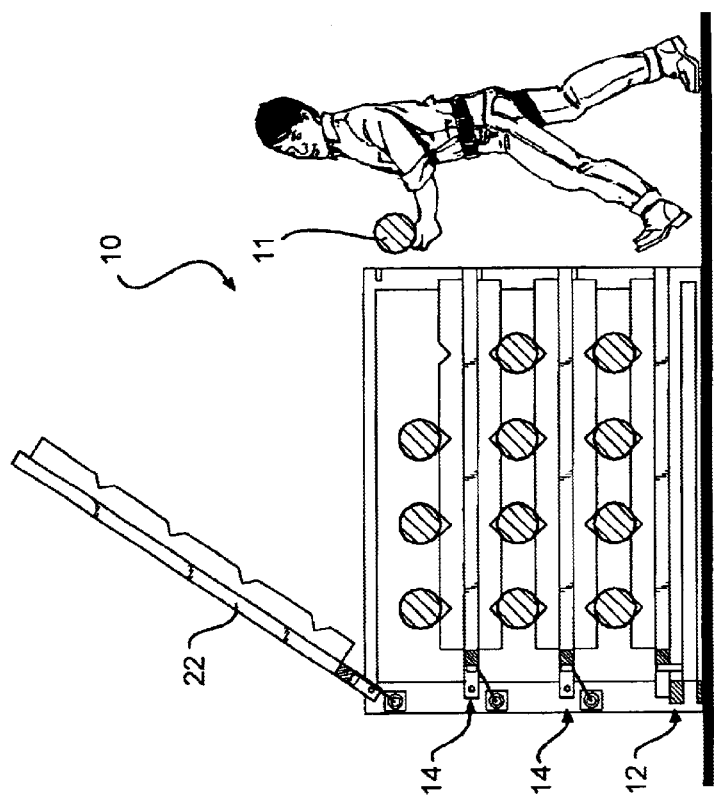
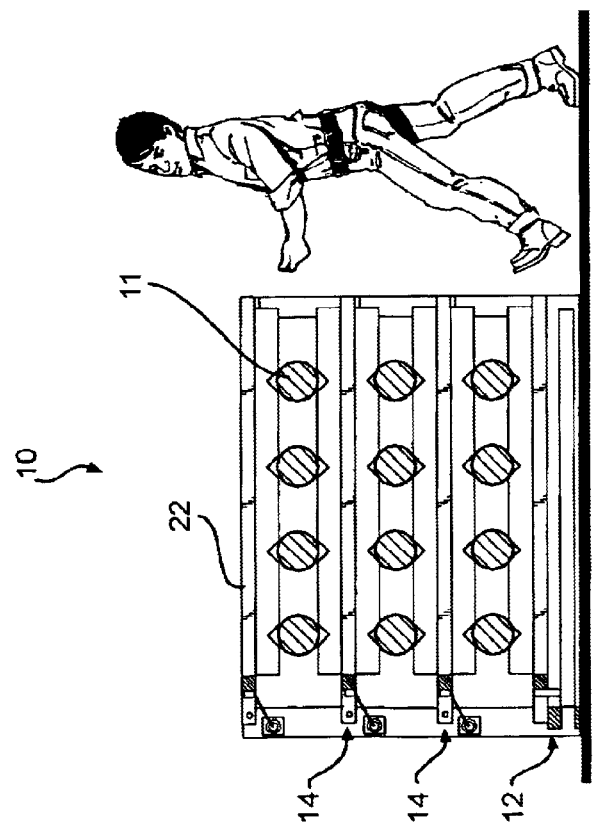
FIG - 8B
FIG - 8A

SHIPPING RACK WITH TORSIONALLY LOADED SHELF

RELATED APPLICATIONS

This application claims priority to U.S. Provisional Application No. 60/314,121 filed Aug. 22, 2001.

FIELD OF THE INVENTION

The present invention relates generally to shipping/storage racks. More particularly, the present invention relates to a rack with a torsionally loaded shelf.

BACKGROUND OF THE INVENTION

Typically, in order to satisfy ergonomic regulations, certain racks include a pair of gas-shocks that biases upward movement of a manually pivotable shelf from a stowed position (i.e. a down position) to a deployed position (i.e. an up position). Essentially, the gas-shocks reduce the amount of effort needed by an operator to lift a heavy pivotable shelf on the rack from the stowed position to the deployed position.

Although adequate for most applications, the gas-shocks are a high-maintenance item that are sensitive to damaging side-impacts. Even further, the gas-shocks typically comprise a nitrogen-charged cylinder that may fail in a number of different ways. For example, the gas-shocks are very temperature-sensitive; if the rack is moved from a cold environment to a warm environment and the gas-shocks are activated without allowing appropriate time to adjust to the new temperature, the gas-shocks may rupture and fail upon activation. Yet even further, the gas-shocks are typically exposed to a gritty, grimy atmosphere in an industrial environment; as a wiper-seal of the respective gas-shocks reciprocates back and forth over the gas-shock's shaft portion, the gas-shocks may become contaminated with abrasives that may compromise the integrity of the gas-shock's wiper-seal, resulting in their undesirable failure.

As a result of the drawbacks associated with conventional gas-shocks that biases upward movement of a rack's pivotable shelf, it is apparent that there is a need for a device that improves upward biasing arrangements of racks.

SUMMARY OF THE INVENTION

In a first embodiment of the invention, a rack is described. The rack comprises at least one pivotable shelf. The pivotable shelf is adapted to conform to one or more component parts. The pivotable shelf comprises an upward biasing arrangement. The upward biasing arrangement includes a spring actuated device that biases upward movement of the pivotable shelf.

A second embodiment of the invention is a rack. In this embodiment, the first and second adjusting mechanisms further comprise an inner cup and an outer cup, respectively. The first and second torsion bars include a first and second end. The first torsion bar extends from a first corner post at its first end to a first receiving portion of a rear arm at its second end, and the second torsion bar extends from a second corner post at its first end to a second receiving portion of the rear arm at its second end. The first and second torsion bars are rigidly fastened, at both of their first and second ends, to the first and second receiving portions and the corner posts, respectively. The first and second torsion bars are welded to the first and second adjusting mechanisms, respectively, that are located at the first and second corner posts, respectively. The outer cup of the first and second adjusting mechanisms includes an opening that allows passage of the first and second torsion bars, respectively, for termination at the inner cup of the first and second adjusting mechanisms, respectively. The first and second torsion bars are welded to the inner cup of the first and second adjusting mechanisms, respectively. The outer cup of the first and second adjusting mechanisms are welded to one the first and second corner posts, respectively, and the inner cup of the first and second adjusting mechanisms are free to rotate within the outer cup of the first and second adjusting mechanisms, respectively. The inner cup of the first and second adjusting mechanisms includes torquing tool receiving passages that extend through the inner cup of the first and second adjusting mechanisms such that a torquing tool can be matingly received at the torquing tool receiving passages for the purpose of rotating the inner cup of the first and second adjusting mechanisms in order to pre-torque the first and second torsion bars, respectively. The outer cup of the first and second adjusting mechanisms comprises a first pin receiving passage, and the inner cup of the first and second adjusting mechanisms comprises a plurality of second pin receiving passages.

The second embodiment of the invention also comprises a first and second locking pin. The first and second locking pins are passed, respectively, through the first pin receiving passage and then through one of a plurality of second pin receiving passages in the outer cup and inner cup, respectively, in order to prevent any relative movement between the inner cup and the outer cup of the first and second adjusting mechanisms, respectively.

Another embodiment of the invention is a rack. In this embodiment, the rack comprises means for adjusting torque and means for biasing upward movement of a pivotable shelf. The means for adjusting torque is a pair of adjusting mechanisms. The means for biasing upward movement of a pivotable shelf is a pair of torsion bars made from spring steel.

Various additional aspects and advantages of this invention will become apparent to those skilled in the art from the following detailed description of the preferred embodiment, when read in light of the accompanying drawings.

BRIEF DESCRIPTION OF THE DRAWING

FIG. 4 is a cross-sectional view of a locking mechanism;

FIG. 5 is a perspective view of an adjusting mechanism and a torsion bar according to the rack depicted in FIG. 1;

FIGS. 8A–8D is a side view of the rack of FIG. 1 showing the removal of payload and the deployment of the pivotable shelves.

DESCRIPTION OF THE PREFERRED EMBODIMENTS

Figure 1:
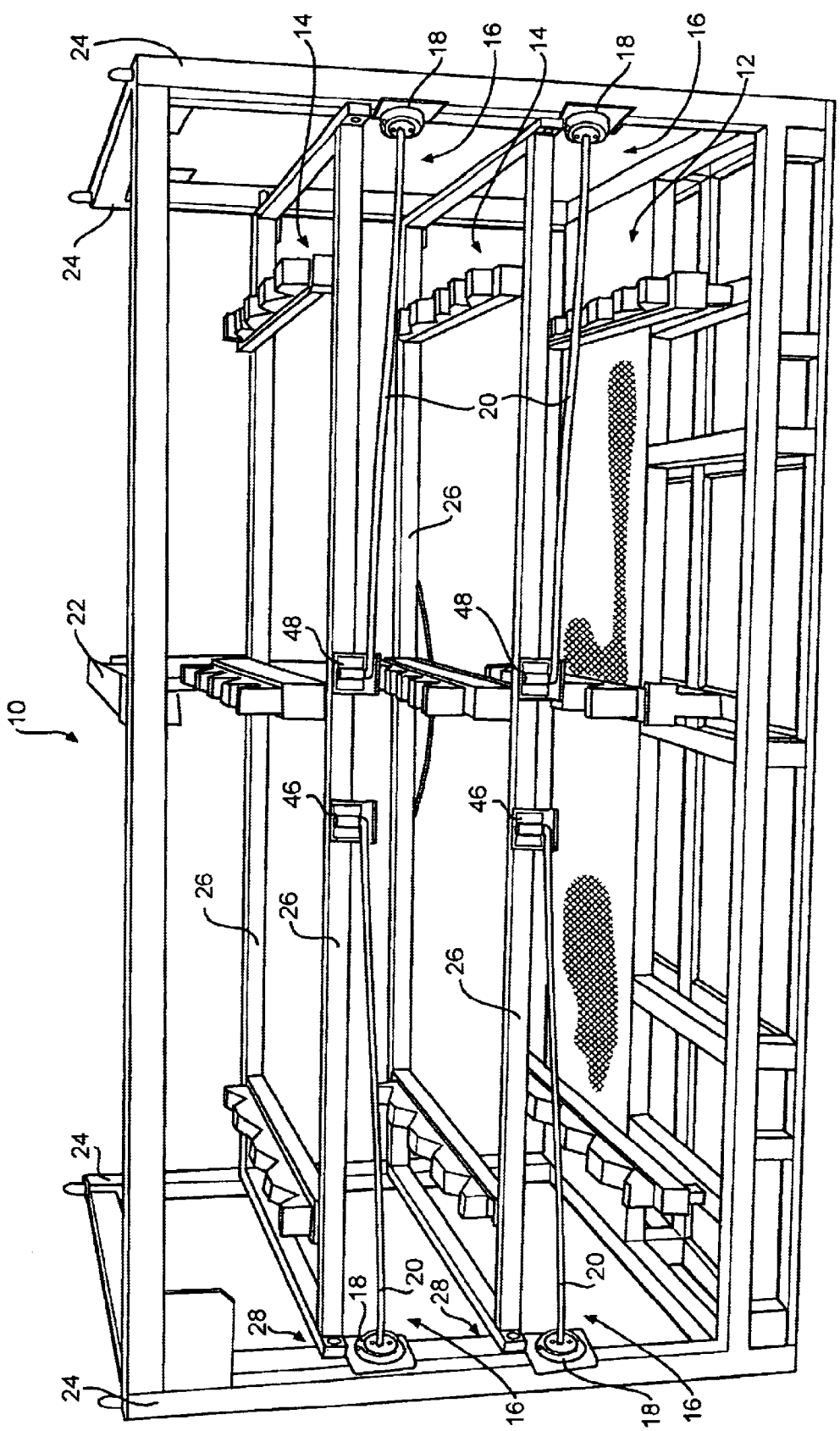
FIG. 1 depicts a rear perspective view of a rack with pivotable shelves in a stowed position.
Figure 2:
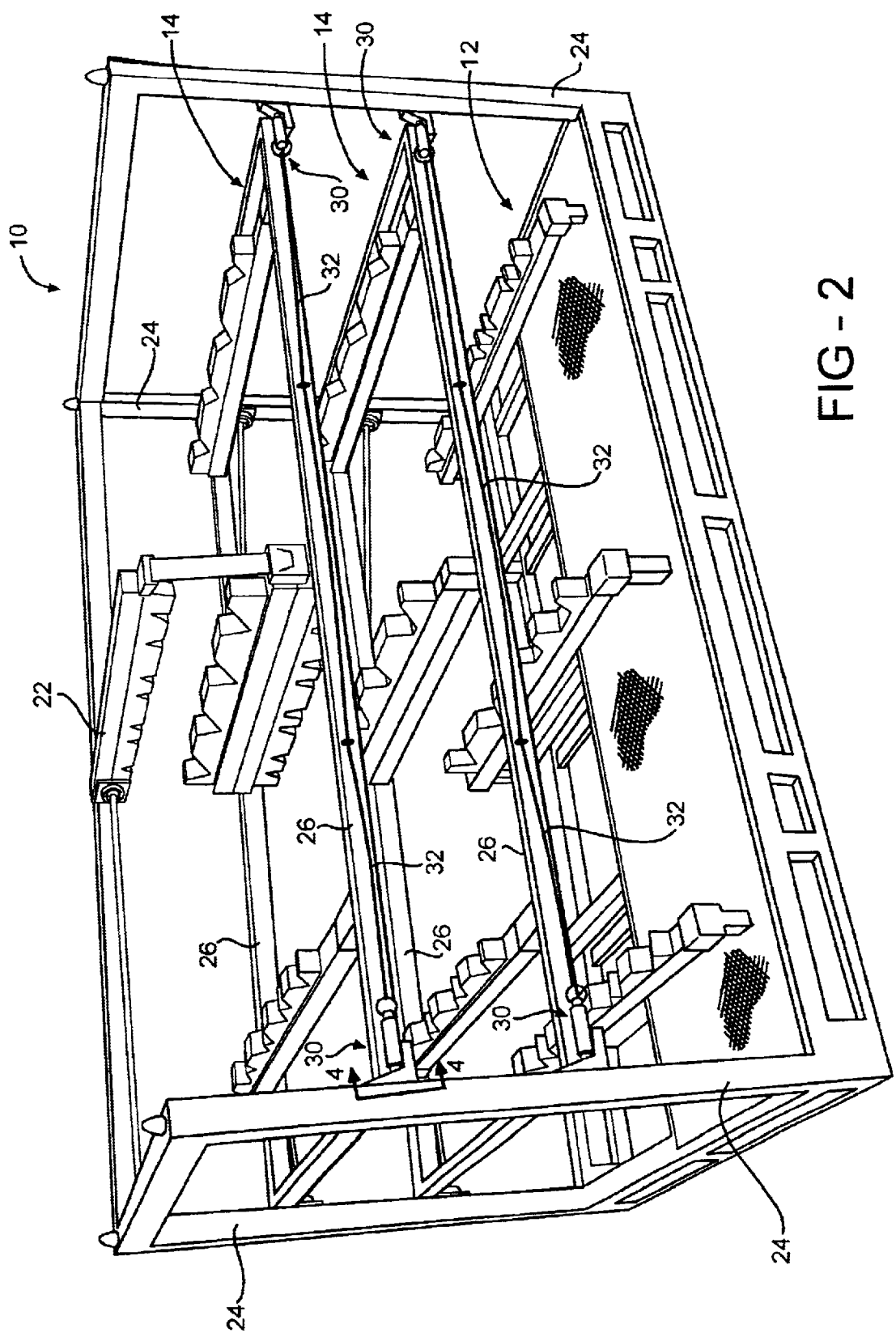
FIG. 2 depicts a front perspective view of the rack of FIG. 1.

As seen in FIGS. 1 and 2, the present invention is directed to a shipping/storage rack, which is shown generally at 10, that may be made from cold rolled steel or a similar material that includes a fixed, base shelf 12 and at least one pivotable shelf 14 adapted to conform to one or more component parts, which is hereinafter referred to as payload 11 (FIGS. 8A–8D), that may be shipped via truck, rail, barge, or the like. The rack 10 includes an inventive upward biasing arrangement 16 (FIGS. 1, 3, and 5–7) for each pivotable shelf 14 that comprises means for adjusting torque, such as a pair of adjusting mechanisms 18, and means for biasing upward movement of the pivotable shelf 14, such as a spring activated device, for example, a pair of torsion bars 20 made from spring steel or the like. Although biasing arrangement 16 is shown as including torsion bars 20, it is fully contemplated in this disclosure that torsion bars 20 can be replaced by a conventional coil spring that may accomplish upward biasing of the pivotable shelf 14.

In the illustrated embodiment according to FIG. 1, the rack 10 includes two pivotable shelves 14. Each pivotable shelf 14 comprises a pair of adjusting mechanisms 18 and a pair of torsion bars 20, thereby permitting each pivotable shelf 14 to pivot on its own. Although the present invention is illustrated showing two pivotable shelves 14, it will be appreciated that the invention is not limited to two pivotable shelves 14 and that one, two, three, or any desirable number of pivotable shelves 14 may be included in the design of the present invention. Although the amount of pivotable shelves 14 are not meant to be restricted, the amount of pivotable shelves 14 included in the design of the rack 10 may vary, which depends on the height of the payload 11 that is stored on each shelf 12, 14. Even further, the pivotable shelves 14 may be individual units that can be adaptable to stack upon the base shelf 12 or other pivotable shelves 14. Alternatively, the base shelf 12 and pivotable shelves 14 comprising the rack 10 may be a single, whole unit. In either embodiment, the upper-most pivotable shelf 14 includes a close-off bar 22 that secures payload 11 in the upper-most pivotable shelf 14 of the rack 10.

The rack 10 is also defined by a plurality of corner posts 24 extending generally upwards from the base shelf 12. The pivotable shelves 14 are each supported by two or more arms 26 by way of a pivoting mechanism 28. For understanding the clarity of the operation of the rack 10, the pivotable shelves 14 are shown in a stowed position in FIGS. 1–2, and, in contrast, the pivotable shelves 14 are shown in a deployed position in FIG. 3.

Figure 3:
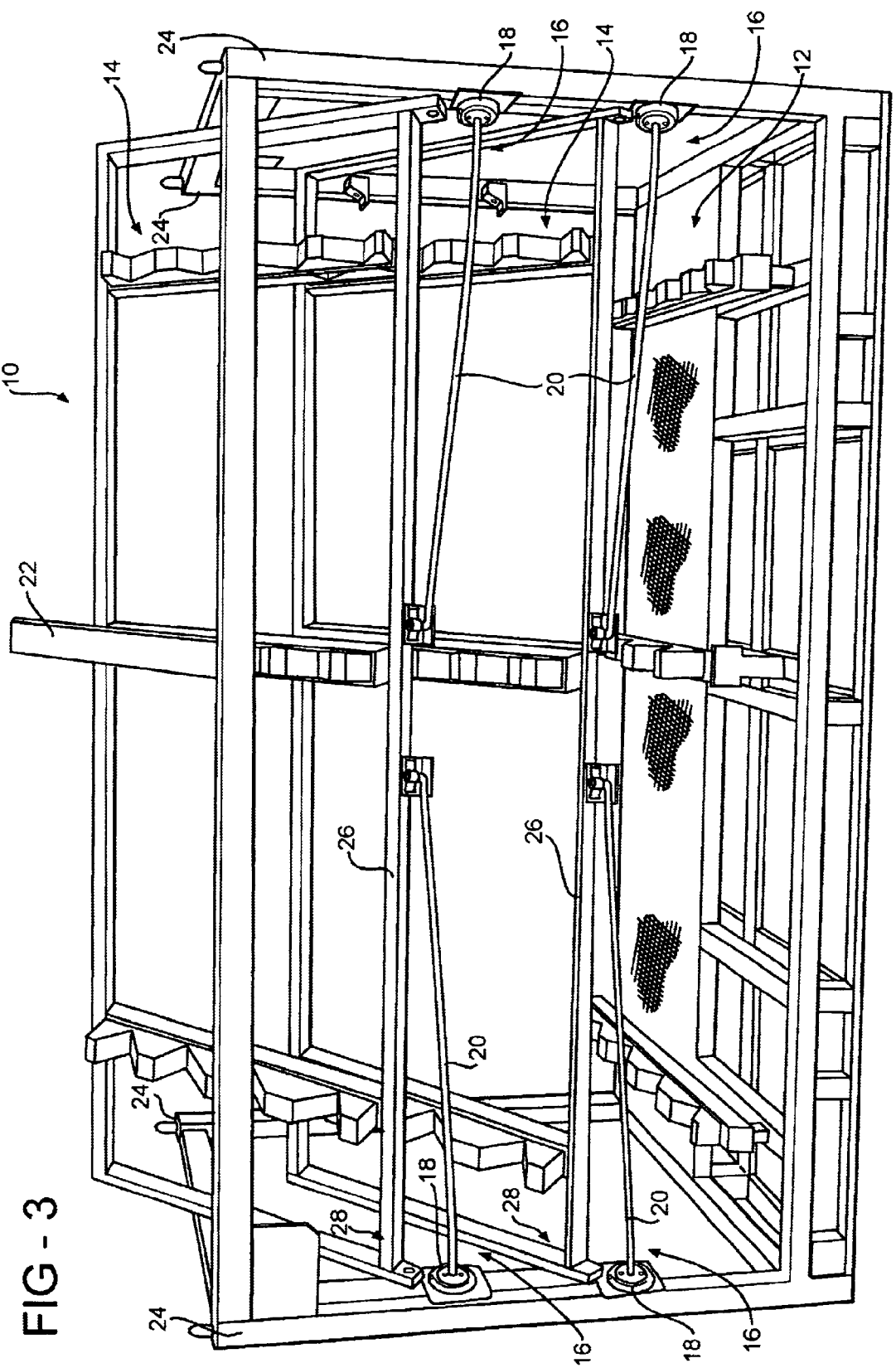
FIG. 3 depicts a rear perspective view of the rack of FIG. 1 with the pivotable shelves in a deployed position.

As shown in FIG. 4, prior to pivoting the pivotable shelves 14 to a deployed position, the pivoting mechanism 28 may be activated (i.e. unlocked) by a locking mechanism 30 including a vinyl coated cable 32 connected to a steel ring 34, a spring 36, and a plunger pin 38. The plunger pin 38 is encompassed by a plunger body 40 that may be welded to a portion of one of the arms 26 near the front corner posts 24 (FIG. 2). When the pivotable shelf 14 is in a stowed position (FIGS. 1–2), the plunger pin 38 may extend into a receiving passage 42. The receiving passage 42 may be a passage in the corner post 24, or if desired, a passage in a bracket (not shown) that may be welded onto the corner post 24. Accordingly, the pivoting mechanism 28 may be unlocked when the operator pulls the vinyl coated cable 32 so that the plunger pin 38 may retract from the receiving passage 42, thereby freeing the pivoting mechanism 28 to pivot the pivotable shelf 14 in a deployed position (FIG. 3).

Each adjusting mechanism 18 communicates with one of the torsion bars 20, and the torsion bars 20 communicate with the pivotable shelf 14. Referring specifically to FIG. 1, one of the torsion bars 20 extend from a corner post 24 on the left side of the rack 10 to a first receiving portion 46 of a rear arm 26, and the other torsion bar 20 extends from a corner post 24 on the right side of the rack 10 to a second receiving portion 48 of the rear arm 26. Both torsion bars 20 are rigidly fastened, at both of their ends, to the receiving portions 46, 48 at the rear arm 26 and at the adjusting mechanisms 18, respectively, such that no significant relative movement exists. In operation, each adjusting mechanism 18 permits an operator to apply a pre-calibrated torque on the torsion bars 20. The pre-calibrated torque will depend on the weight of the moveable shelf 14. For example, the moveable shelf 14 may be a light-weight shelf, a medium weight shelf, or a heavy-weight shelf.

In its simplest form, the torsion bars 20 can simply be welded at both of their respective ends to the left and right corner posts 24, respectively. However, to do so would make it very difficult, if not impossible, to calibrate the torsion load so that the torsion bars 20 are able to pivot the pivotable shelf 14. Therefore, the adjusting mechanisms 18 are used in order to calibrate the appropriate torsional load exerted by the torsion bars 20 on the pivotable shelf 14.

Figure 7:
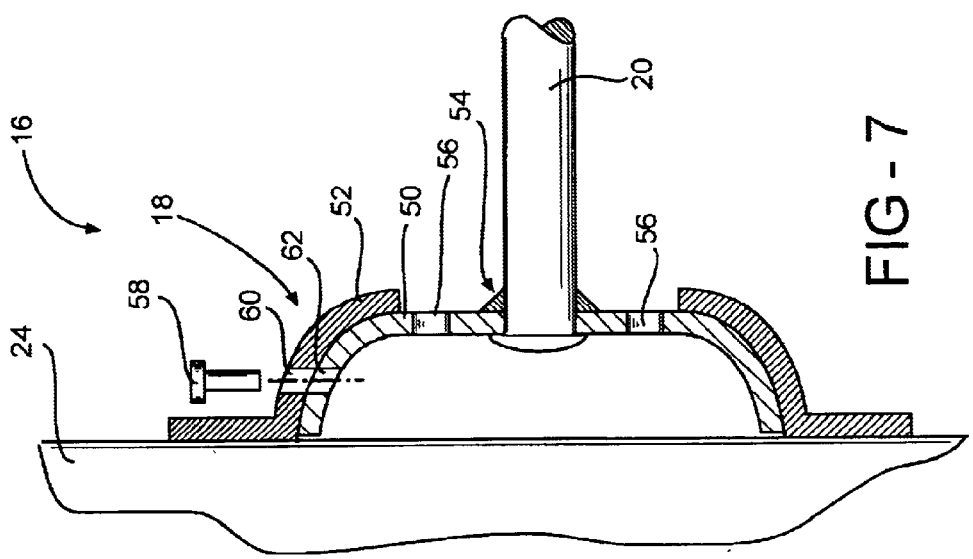
FIG. 7 is a cross-sectional view of the adjusting mechanism and a torsion bar of FIG. 5.
Figure 6:
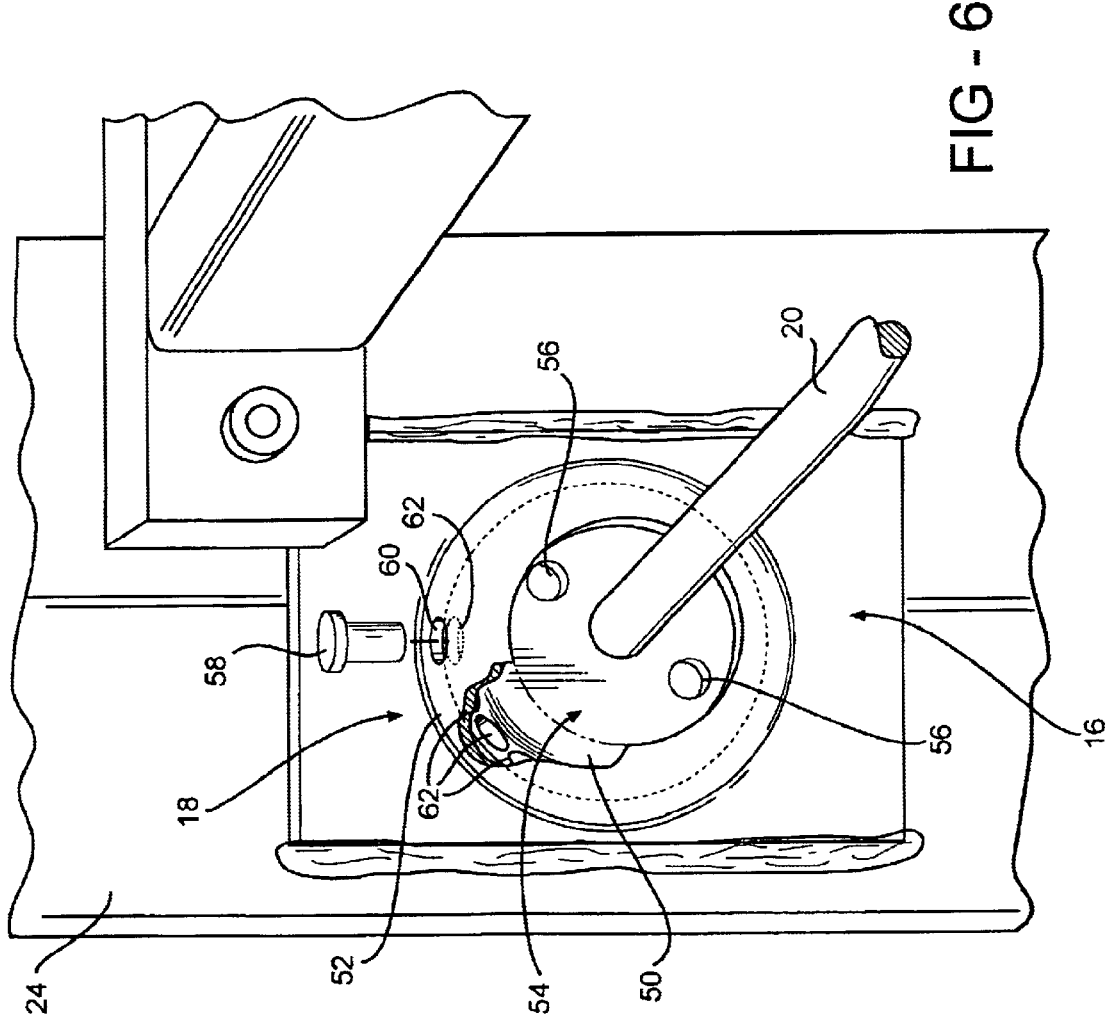
FIG. 6 is a partial phantom view of the adjusting mechanism and a torsion bar of FIG. 5 including a locking pin.

Referring now to FIGS. 5–7, one torsion bar 20 and one adjusting mechanism 18 is shown affixed to a corner post 24 and rear arm 26 of a pivotable shelf 14. One end of the torsion bar 20 terminates into an inner cup 50 of the adjusting mechanism 18. Although one torsion bar 20 and one adjusting mechanism 18 is shown in FIGS. 5–7, the following description is applicable to the opposing torsion bar 20 and adjusting mechanism 18 applied to the same pivotable shelf 14 illustrated in FIGS. 5–7.

The adjusting mechanism 18 is shown in greater detail in FIGS. 6–7 wherein the adjusting mechanism 18 consists of an outer cup 52 and the inner cup 50. The outer cup 52 is welded, or otherwise securely fastened, to one of the corner posts 24, and the inner cup 50 is free to rotate within the outer cup 52. The outer cup 52 includes an opening 54, allowing passage of the torsion bar 20 for termination at the inner cup 50. Preferably, the torsion bar 20 is welded, or otherwise securely fastened, to the inner cup 50. The inner cup 50 includes torquing tool receiving passages 56 that extend through the inner cup 50 such that a torquing tool (not shown), for example, a spanner wrench, can be matingly received at torquing tool receiving passages 56 for the purpose of rotating the inner cup 50 to pre-torque the torsion bar 20.

Once the appropriate pre-torque is placed on the torsion bar 20, a locking pin 58 such as for example, a set screw, or any other suitable locking means, can be used to prevent any further relative movement between the inner cup 50 and the outer cup 52. As illustrated in FIGS. 6–7, the locking pin 58 is firstly passed through a first pin receiving passage 60 and then through one of a plurality of second pin receiving passages 62 in the outer cup 52 and inner cup 50, respectively. In the alternative, rather than employing the locking pin 58, it is even possible to weld the inner cup 50 to the outer cup 52 once the appropriate pre-torque has been placed on the torsion bar 20 by the torquing tool.

Thus, the adjusting mechanism 18 provides a way of placing a pre-calibrated torque on the torsion bar 20 such that the weight of the pivotable shelf 14 is easily biased by the torsion bar 20, thereby providing the ability to expose the payload 11 on the shelf immediately below. Therefore, when the pivotable shelf 14 is in an unloaded condition, the pivotable shelf 14 may be easily pivoted upward by an operator and sufficiently held in place such that the pivotable shelves 14 remain in a deployed position without the assistance of the operator. Accordingly, when both torsion bars 20 are pre-torqued, the torsion bars 20 provide an energy source that urges against the pivotable shelf 14 in such a way so as to bias it upwardly.

Figure 8D:
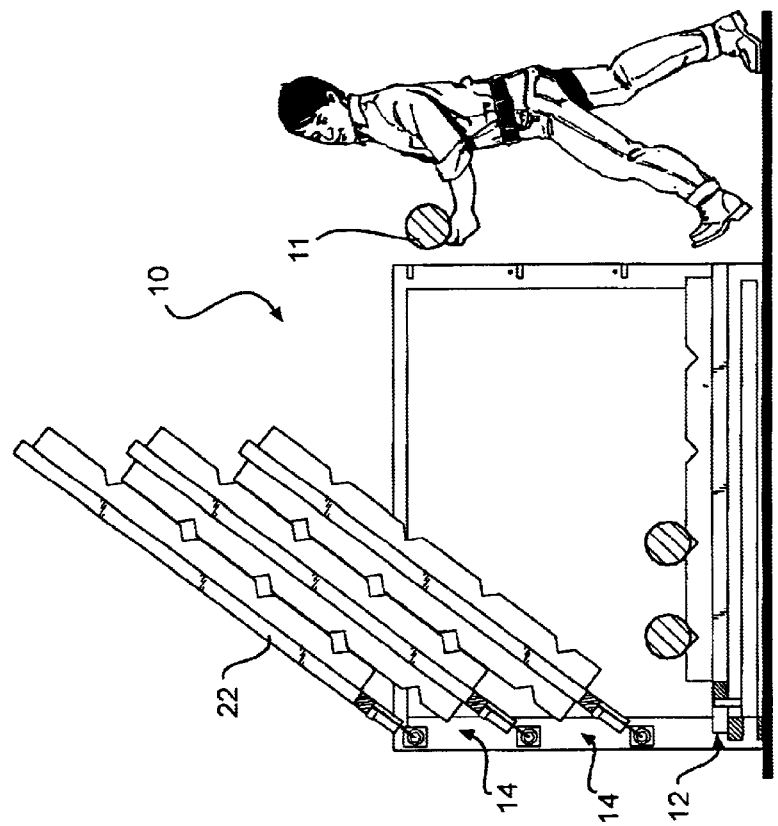

Referring now to FIG. 8A, the base shelf 12 and the two pivotable shelves 14 are shown in a stowed position with a full payload 11 on each shelf. In the illustrated embodiment according to FIGS. 8A–8D, the operator has already applied the pre-calibrated torque on the torsion bars 20, resulting in an upward force that biases the pivotable shelves 14. Accordingly, as shown in FIGS. 8A–8B, once the operator removes the payload 11 from the top pivotable shelf 14 and unlocks the locking mechanism 30, the pre-calibrated torque from the torsion bars 20 that acts upon the top pivotable shelf 14 permits the operator to easily pivot the top pivotable shelf 14 to a deployed position (FIG. 8C), exposing the payload 11 on the middle pivotable shelf 14. Essentially, the torsion bars 20 biases the pivotable shelf such that the operator may only have to apply a minimal amount of force, such as for example, approximately 15 pounds, on the pivotable shelf 14 in order fully deploy the pivotable shelf 14 in a deployed position.

Figure 8C:
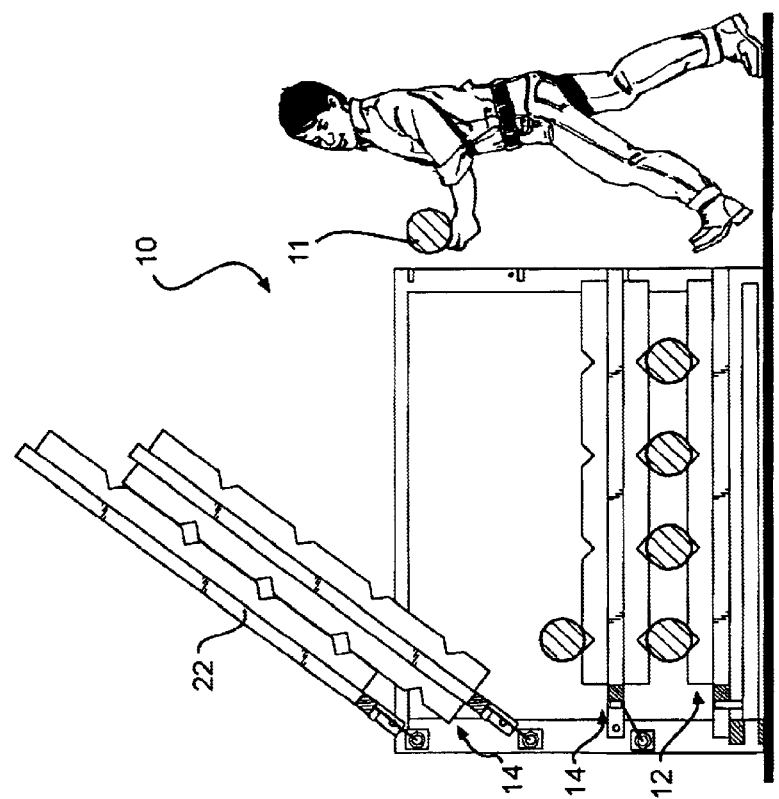

Then, as shown in FIGS. 8C–8D, in similar fashion as described above, once the operator removes the payload 11 from the middle pivotable shelf 14 and unlocks the locking mechanism 30, the pre-calibrated torque from the torsion bars 20 that acts upon the middle pivotable shelf 14 permits the operator to easily pivot the middle pivotable shelf 14 to a deployed position, exposing the payload 11 on the base shelf 12 (FIG. 8D). In an alternative embodiment, the locking mechanism 30 may be obviated such that the pre-calibrated torque from the torsion bars 20 may be adjusted such that the pivotable shelves 14 may be automatically deployed to an up position upon complete removal of the payload 11 from its respective pivotable shelf 14.

The rack 10 described above overcomes the fallbacks of conventional gas-shocks that biases upward movement of the pivotable shelves 14. The design and materials of the adjusting mechanisms 18 and the torsion bars 20, respectively, are less susceptible to failure as compared to conventional gas-shocks. Because the adjusting mechanisms 18 and the torsion bars 20 do not comprise a nitrogen-charged cylinder, the rack 10 may also be quickly transported from environments having differing temperature extremes without compromising the ability to easily deploy the pivotable shelves 14. Even further, the adjusting mechanisms 18 and the torsion bars 20 permits an operator to adjust the amount of torque applied to the torsion bars 20 such that an operator may apply a minimal amount of force to deploy the pivotable shelves in an up position. Even further, the torsion bars 18 may be torqued to a point where upon full removal of the payload 11 from its respective pivotable shelf 14, full, automatic deployment of the pivotable shelves 14 may be achieved, obviating the need for an operator to manually lift the pivotable shelf 14 in an upward position.

Figure 9:
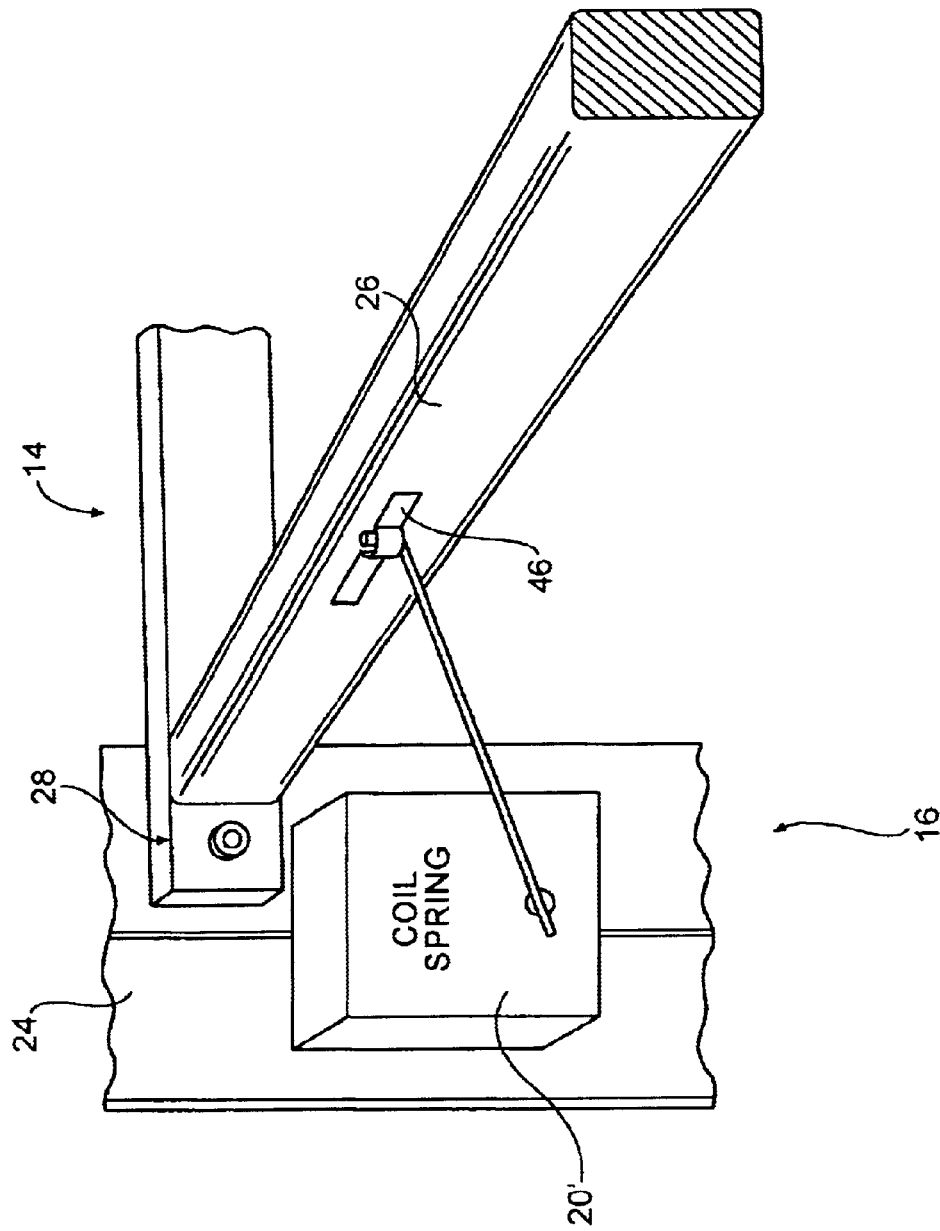
FIG. 9 is a second embodiment of the present invention wherein the upward biasing arrangement is a coil spring.

FIG. 9 depicts a second embodiment of the present invention wherein the upward biasing arrangement 16 includes a coil spring 20' (shown schematically) which is connected to arm 26. In all other ways the embodiment of FIG. 9 functions identically to that of the previous FIGS.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. Accordingly, it is to be understood that the subject matter sought to be afforded protection hereby, should be deemed to extent to the subject matter defined in the appended claims, including all fair equivalence thereof.

What is claimed is:

1. A rack, comprising:
    at least one pivotable shelf adapted to conform to one or more component parts, wherein the pivotable shelf comprises an upward biasing arrangement, wherein the upward biasing arrangement includes:
        a spring actuated device that biases upward movement of the pivotable shelf.

2. The rack of claim 1, wherein the spring actuated device is a first and second torsion bar.

3. The rack of claim 2, wherein the biasing arrangement of further comprises a first and second adjusting mechanism for adjusting the amount of torque applied to the first and second torsion bars.

4. The rack of claim 2, wherein the first and second torsion bars include a first and second end, wherein the first torsion bar extends from a first corner post at its first end to a first receiving portion of a rear arm at its second end, and the second torsion bar extends from a second corner post at its first end to a second receiving portion of the rear arm at its second end, wherein the first and second torsion bars are rigidly fastened, at both of their first and second ends, to the first and second receiving portions and the corner posts, respectively.

5. The rack of claim 4, wherein the first and second torsion bars are welded at both of their respective first ends to the first and second corner posts, respectively.

6. The rack of claim 4, wherein the first and second torsion bars are welded to the first and second adjusting mechanisms, respectively, that are located at the first and second corner posts, respectively.

7. The rack of claim 6, wherein the first and second adjusting mechanisms further comprise an inner cup and an outer cup, respectively.

8. The rack of claim 7, wherein the outer cup of the first and second adjusting mechanisms includes an opening that allows passage of the first and second torsion bars, respectively, for termination at the inner cup of the first and second adjusting mechanisms, respectively.

9. The rack of claim 8, wherein the first and second torsion bars are welded to the inner cup of the first and second adjusting mechanisms, respectively.

10. The rack of claim 9, wherein the outer cup of the first and second adjusting mechanisms are welded to one the first and second corner posts, respectively, and the inner cup of the first and second adjusting mechanisms are free to rotate within the outer cup of the first and second adjusting mechanisms, respectively.

11. The rack of claim 10, wherein the inner cup of the first and second adjusting mechanisms includes torquing tool receiving passages that extend through the inner cup of the first and second adjusting mechanisms such that a torquing tool can be matingly received at the torquing tool receiving passages for the purpose of rotating the inner cup of the first and second adjusting mechanisms in order to pre-torque the first and second torsion bars, respectively.

12. The rack of claim 11, wherein the outer cup of the first and second adjusting mechanisms comprises a first pin receiving passage, and the inner cup of the first and second adjusting mechanisms comprises a plurality of second pin receiving passages.

13. The rack of claim 12 further comprising a first and second locking pin, wherein the first and second locking pins are passed, respectively, through the first pin receiving passage and then through one of a plurality of second pin receiving passages in the outer cup and inner cup, respectively, in order to prevent any relative movement between the inner cup and the outer cup of the first and second adjusting mechanisms, respectively.

14. The rack of claim 12, wherein the inner cup is welded to the outer cup of the first and second adjusting mechanisms, respectively, once the pre-torque has been placed on the first and second torsion bars, respectively by the torquing tool.

15. The rack of claim 1, wherein the pivotable shelf is supported by two or more arms by way of a pivoting mechanism.

16. The rack of claim 15, wherein the pivoting mechanism is unlocked by a locking mechanism including a vinyl coated cable connected to a steel ring, a spring, and a plunger pin, wherein the plunger pin is encompassed by a plunger body that may be welded to a portion of one of the arms, wherein the plunger pin may extend into a receiving passage.

17. The rack of claim 16, wherein the receiving passage is located in a corner post.

18. The rack of claim 17, wherein the receiving passage is located in a bracket that may be welded onto the corner post.

19. The rack of claim 2, wherein the torsion bars comprise spring steel.

20. The rack of claim 1, wherein the spring actuated device is a coil spring.

21. A rack, comprising:
   a fixed base shelf; and
   at least one pivotable shelf adapted to conform to one or more component parts, wherein the pivotable shelf comprises an upward biasing arrangement, wherein the upward biasing arrangement includes:
      a first and second torsion bar that biases upward movement of the pivotable shelf, and
      a first and second adjusting mechanism for adjusting the amount of torque applied to the first and second torsion bars, wherein the first and second adjusting mechanisms further comprise an inner cup and an outer cup, respectively,
   wherein the first and second torsion bars include a first and second end, wherein the first torsion bar extends from a first corner post at its first end to a first receiving portion of a rear arm at its second end, and the second torsion bar extends from a second corner post at its first end to a second receiving portion of the rear arm at its second end,
   wherein the first and second torsion bars are rigidly fastened, at both of their first and second ends, to the first and second receiving portions and the corner posts, respectively,
   wherein the first and second torsion bars are welded to the first and second adjusting mechanisms, respectively, that are located at the first and second corner posts, respectively,
   wherein the outer cup of the first and second adjusting mechanisms includes an opening that allows passage of the first and second torsion bars, respectively, for termination at the inner cup of the first and second adjusting mechanisms, respectively,
   wherein the first and second torsion bars are welded to the inner cup of the first and second adjusting mechanisms, respectively,
   wherein the outer cup of the first and second adjusting mechanisms are welded to one the first and second corner posts, respectively, and the inner cup of the first and second adjusting mechanisms are free to rotate within the outer cup of the first and second adjusting mechanisms, respectively,
   wherein the inner cup of the first and second adjusting mechanisms includes torquing tool receiving passages that extend through the inner cup of the first and second adjusting mechanisms such that a torquing tool can be matingly received at the torquing tool receiving passages for the purpose of rotating the inner cup of the first and second adjusting mechanisms in order to pre-torque the first and second torsion bars, respectively,
   wherein the outer cup of the first and second adjusting mechanisms comprises a first pin receiving passage, and the inner cup of the first and second adjusting mechanisms comprises a plurality of second pin receiving passages,
   a first and second locking pin, wherein the first and second locking pins are passed, respectively, through the first pin receiving passage and then through one of a plurality of second pin receiving passages in the outer cup and inner cup, respectively, in order to prevent any relative movement between the inner cup and the outer cup of the first and second adjusting mechanisms, respectively.

22. The rack of claim 21, wherein the pivotable shelf is supported by two or more arms by way of a pivoting mechanism.

23. The rack of claim 22, wherein the pivoting mechanism is unlocked by a locking mechanism including a vinyl coated cable connected to a steel ring, a spring, and a plunger pin, wherein the plunger pin is encompassed by a plunger body that may be welded to a portion of one of the arms, wherein the plunger pin may extend into a receiving passage.

24. The rack of claim 23, wherein the receiving passage is located in a corner post.

25. The rack of claim 24, wherein the receiving passage is located in a bracket that may be welded onto the corner post.

26. The rack of claim 21, wherein the torsion bars comprise spring steel.

27. A rack comprising:
   means for adjusting torque, wherein the means for adjusting torque is a pair of adjusting mechanisms; and
   means for biasing upward movement of a pivotable shelf, wherein the means for biasing movement of the pivotable shelf is a pair of torsion bars made from spring steel.

* * * * *